United States Patent [19]

Stranko et al.

[11] Patent Number: 4,464,751
[45] Date of Patent: Aug. 7, 1984

[54] MACHINE CHECK COORDINATION

[75] Inventors: Thomas A. Stranko; Robert L. Swann, both of Poughkeepsie, N.Y.

[73] Assignee: International Business Machines Corp., Armonk, N.Y.

[21] Appl. No.: 320,162

[22] Filed: Nov. 10, 1981

[51] Int. Cl.³ .................................... G06F 11/30
[52] U.S. Cl. ............................ 371/29; 364/900
[58] Field of Search ............ 371/29; 364/200, 900

[56] References Cited

U.S. PATENT DOCUMENTS

| 3,707,714 | 12/1972 | Plumley | 371/29 X |
| 4,135,662 | 1/1979 | Dlugos | 371/29 |
| 4,395,755 | 7/1983 | Wakai | 364/200 |

OTHER PUBLICATIONS

Wood, "First Alarm Indicator", *IBM Technical Disclosure Bulletin*, vol. 3, No. 7, Dec. 1960, pp. 18–19.

*Primary Examiner*—David H. Malzahn
*Attorney, Agent, or Firm*—James E. Murray

[57] ABSTRACT

This mechanism preserves the identity of the first error condition which is capable of causing a machine check even though other such conditions may have occurred before the data processing machine has stopped. After the first machine check condition has been examined, the remaining conditions, if any, will be examined in accordance with a predetermined priority irrespective of the time sequence in which they occur.

4 Claims, 3 Drawing Figures

MACHINE CHECK COORDINATION

BACKGROUND OF THE INVENTION

This invention relates to apparatus and methods for preserving the identity of the first one of a series of error conditions, each of which can give rise to a machine check interrupt in a data processing system. Indications of other error conditions which may result from propagation of the original error are also preserved for subsequent analysis.

It is common in modern electronic data processing systems to have various indicators for showing that certain error conditions have occurred. Typically, these error conditions may be used to cause one or more functional units of the system to stop. However, subsequent to the occurrence of the error, but before the functional unit actually stops, the original error may propagate and cause other error indications to occur. Thus, when the unit finally stops, more than one error indication may be present, making it difficult to determine which error initiated the stoppage.

The prior art has, in some situations, dealt with the problem by using time-consuming analysis techniques to find which of several error indications most probably occurred first. Not only do these analyses take time, but they do not always give correct results.

BRIEF SUMMARY OF THE INVENTION

The above and other problems are solved in accordance with a preferred embodiment of this invention by providing a mechanism for trapping the first one of a sequence of error indications. Subsequent error indications, which may result from propagation of the first error, are retained for subsequent analysis in accordance with a predetermined priority. In the unlikely event that two error indications arise at the same time, a predetermined priority scheme will be utilized to select one of them to be regarded as the first one.

The primary advantage of this invention flows from its identification and trapping of the first to occur of a plurality of errors. Thus, even if a number of errors have occurred prior to the time at which the machine stops, the particular one which initially caused the machine to stop is available for analysis and repair.

DETAILED DESCRIPTION

Descriptions relating to an environment system in which this invention may be implemented are found in the following manuals, all available from International Business Machines Corportion. The manuals are part of the IBM Maintenance Library, 3081 Processor Complex. Individual titles are:

Processor Unit Introduction/Maintenance (PRM) (Form No. SY22-7061);

Central Storage and External Data Controller Introduction/Maintenance (CSM) (EDC) (Form No. SY22-7062);

3082 Processor Controller Maintenance (PCM) (Form No. SY22-7063);

3082 Processor Controller Theory/Diagrams (PCT) (Form No. SY22-7064);

3082 Processor Controller User's Guide (UGD) (Form No. SY22-7065);

Power Operation and Maintenance (PWR) (Form No. SY22-7066);

3087 Coolant Distribution Unit Coolant Distribution and Maintenance (CDU) (Form No. SY22-7067);

3089 Power Unit Installation/Maintanance (PGM) (Serial Numbers Below 41000) (Form No. SY22-7069);

Return Codes and Messages (RCM) (Form No. SY22-7070);

Maintenance Guide (Form No. SY22-7071);

3089 Power Unit Installation/Maintenance (PGM) (Serial Numbers 41000 and Above) (Form No. SY22-7072).

The contents of all of the above manuals are incorporated into this specification by this reference.

Figure 1:
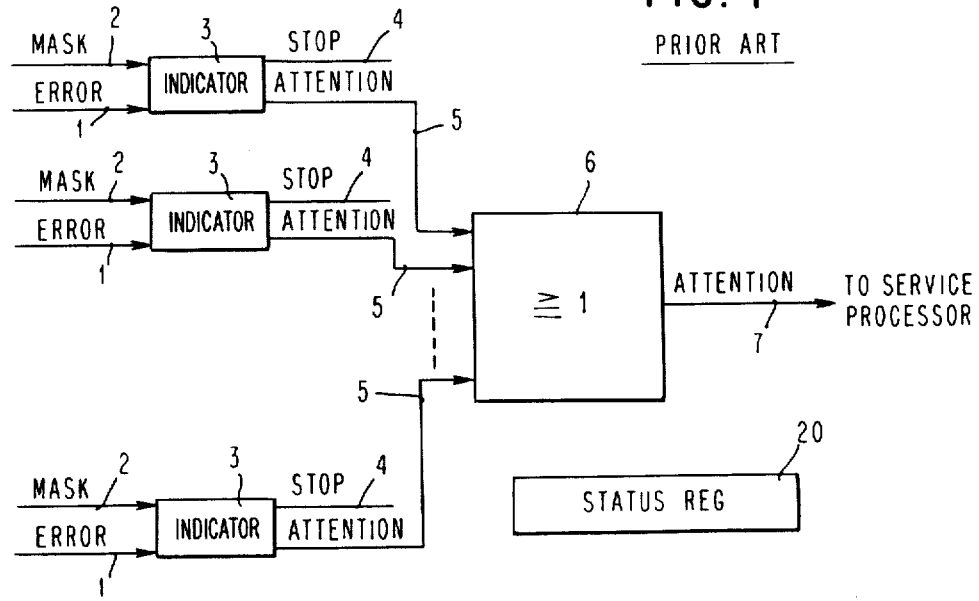
FIG. 1 shows, in block diagram form, a portion of a typical prior art data processing system.

FIG. 1 shows an example of typical prior art error indicating circuitry in a data processing system. A plurality of error lines 1 emanate from various portions of the system which can manifest certain error conditions. Errors which are not inhibited by signals on mask lines 2 are received in related blocks 3. Blocks 3 have two outputs, a first output 4 which causes one or more units to stop, and a second output 5 which, through an OR gate 6, will present an interrupt on line 7 to a service processor. The service processor will be used to analyze the error manifestations to determine the cause of the error and the manner in which it should be repaired. The status of the various error indicators is accessible via status register 20.

A problem involved in the diagnosis of the error condition is that, if more than one error is manifested in the blocks 3, it is not always readily apparent which error caused the initial problem, and which error or errors resulted from propagation of the initial error before the system could stop.

Figure 2:
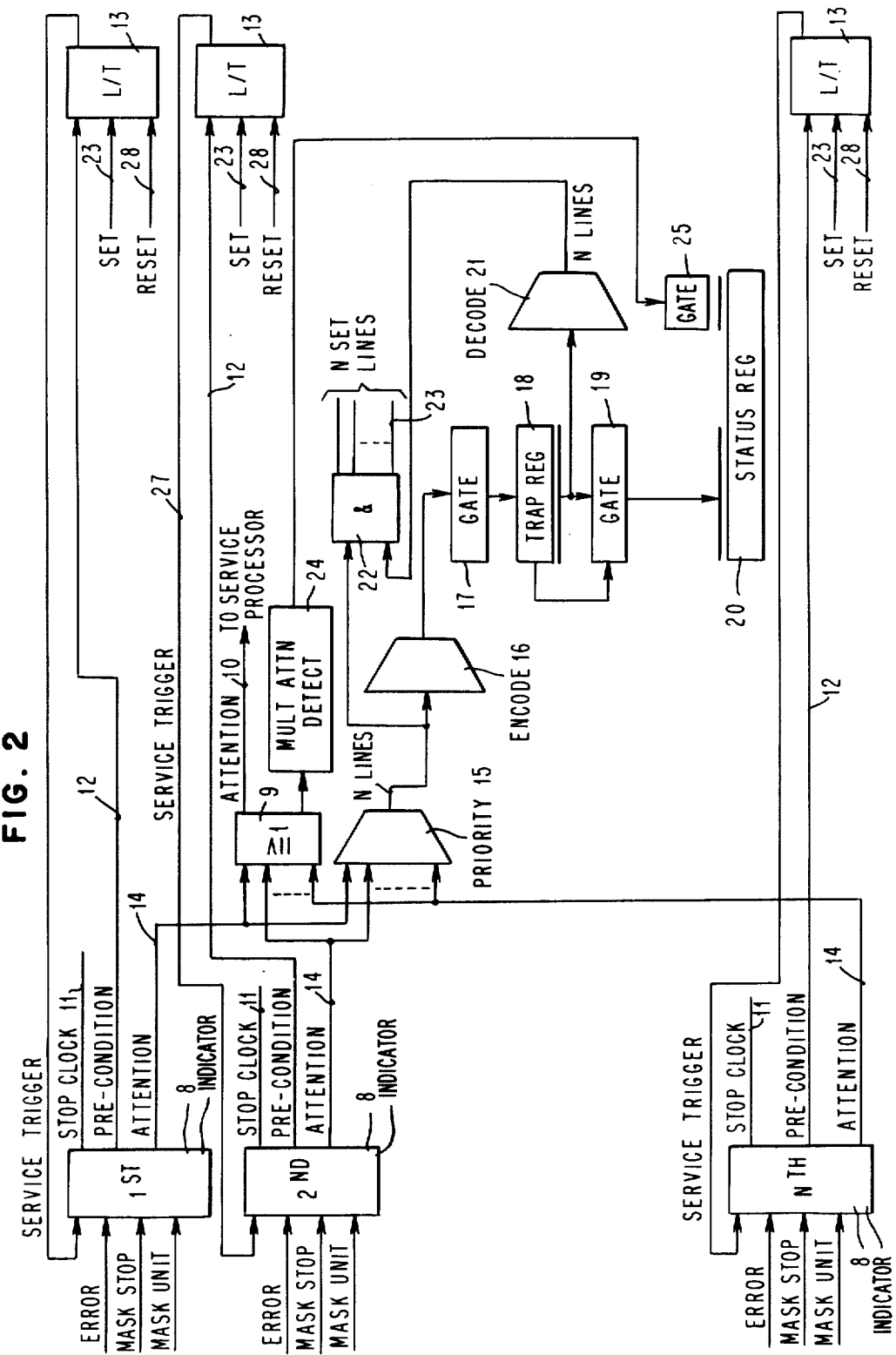
FIG. 2 shows an overall block diagram of a preferred embodiment of the invention.

Referring now to FIG. 2, a block diagram of this invention is presented. The N error indicators 8, OR circuit 9 and attention line 10 which signals a service processor serve essentially the same functions as elements 3, 6 and 7, respectively of the prior art shown in FIG. 1. Each of error indicators 8 has three outputs; a line 11 which is used to stop the clock of the functional unit associated with that error indicator, a pre-condition line 12 which furnishes one of the two inputs required to set an associated latch/trigger pair 13 and an attention line 14 which, after passing through OR circuit 9 furnishes the attention line that is fed to a service processor.

The attention lines 14 also feed a priority network 15 which, through encoder 16 and gate 17 enables the identity of one of the error indicators 8 to be placed into trap register 18. When the contents of trap register 18 are read out through gate 19 into a status register 20, the identification in the trap register also is decoded by decoder 21 and fed, along with the output of priority unit 15 to a bank of N AND circuits 22, the output of which will furnish an appropriate set line 23 to turn on the latch/trigger 13 associated with the error indicator 8 which was identified in the trap register. Also shown in FIG. 2 is a mechanism 24 for detecting the occurrence of multiple attention lines and, through gate 25 setting an indication into status register 20 that more than one attention line 14 was up, thus indicating the sensing of more than one error.

In the following discussion of how the apparatus shown in FIG. 2 operates, we will start with the following initial conditions: no error lines are up; the trap register is not loaded; none of the latch/triggers are set; it is desired that an error in any unit will cause that units clocks to stop and will present an attention line to the service processor.

Assume that the second error indicator shown in FIG. 2 is the first one to receive an error signal. Its attention line 14 will propagate through OR 9 to raise attention line 10 to signal the service processor. At the same time, a signal on its output line 11 will begin to stop the clock of its associated functional unit, and the signal on line 14 will pass through priority tree 15, be encoded by encoder 16, and (because trap register 18 is not yet loaded) be gated through gate 17 into trap register 18. The third output of the second error indicator, pre-condition line 12 will furnish the first of the two necessary outputs to set the related latch/trigger.

The service processor will then issue a read status command which, in conjunction with the TRAP LOADED signal will cause the contents of the trap register to be gated through gate 19 into appropriate positions of status register 20. At this same time, the contents of trap register 18 will be decoded by decoder 21 to raise a line which corresponds with the line emanating from priority tree 15 and which, through AND 22 will raise one of the set lines 23 to turn on the latch/trigger associated with the second error indicator. The output of that latch/trigger is fed back via line 27 to the input of the error indicator and inhibits the outputs of that error indicator.

Let us further assume that, during the time that it took for the clocks of the functional unit associated with the second error indicator to be stopped, the error propagated through the data processing system and caused error indicators to be set in functional units associated with the first and the Nth error indicators. The read status command which moved the contents of trap register 18 into status register 20 also resets trap register 18, thereby enabling the first and Nth error indicators to present their outputs to the priority network 15. Since more than one attention line was up, gate 25 will have passed an indication to status register 20 that more than one error was sensed. After the trap register was unloaded, then the indication of either the first or the Nth error indicator, depending upon their relative priorities, will pass through priority network 15, encoder 16, and gate 17 to be loaded into trap register 18 just as was done previously for the second error indicator. After the service processor has logged the contents of status register 20, it will issue another read status command to load the new contents of trap register 18 into status register 20. As before, this will cause the setting of an appropriate latch/trigger which will result in dropping the attention line of that associated error indicator. Then the contents of the last error indicator which has sensed an error will pass through the priority network 15, encoder 16 and gate 17 into trap register 18 for subsequent reading into the status register. After all error indicators which have received an error signal, and are not otherwise masked, have had their identities recorded, all of them will have had their attention lines inhibited from OR 9 as well as from priority network 15. This will cause the signal on attention line 10 to drop, thus indicating to the service processor that there are no more error situations to be recorded.

When the service processor, or other appropriate system element or human intervenor, corrects the condition which gave rise to the error signal that was input to each of the error indicators, the latch/triggers will be reset via lines 28. The system will then be ready to resume normal functioning.

Figure 3:
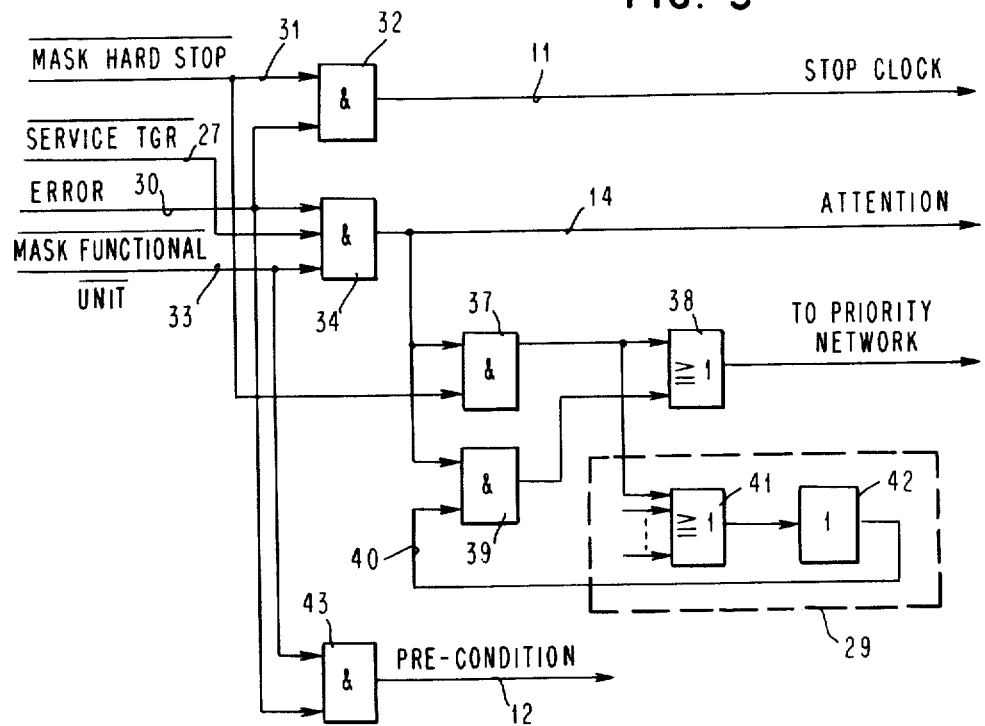
FIG. 3 shows further details of one of the critical logic blocks that is shown in FIG. 2.

Referring now to FIG. 3, additional details are shown of the novel error indicator designs that are used with the preferred embodiment of this invention. Everything shown in FIG. 3, with the exception of the elements within broken line 29 are within the error element 8 shown in FIG. 2.

The occurrence of an error will produce a signal on line 30 and, in conjunction with a signal on line 31 indicating that hard stop on error has not been masked will, through AND circuit 32, produce the stop clock signal on line 11. The error signal on line 30, in conjunction with the service trigger line 27 not being set and the particular functional unit not being masked (line 33) will enable AND 34 in order to produce the attention signal 14 which is fed OR circuit 9 of FIG. 2. As was shown in FIG. 2, that same signal may also be fed directly to the priority network 15.

However, in the preferred embodiment of this invention, a further modification is introduced which forces error indications from units that have been hard stopped to be handled before error indications of units which are not hard stopped, irrespective of their normal priorities. If, for this particular error indicator, hard stop has not been masked off, the output of AND 34, in concurrence with a signal on line 31 will enable AND 37 to pass a signal through OR 38 to the priority network. However, if hard stop for the unit associated with this error indicator has been masked, line 31 will not be up and AND 37 will not be enabled. Then, the signal from AND 34 will be passed to the priority circuit only if AND 39 is enabled by output line 40 from the priority adjusting circuitry 29.

The priority adjusting circuitry 29 simply contains an OR gate 41 and an inverter 42. Or gate 41 receives one input from each of the AND circuits 37 that appears in every one of the error indicators. If any error indicator shows an error for an unmasked functional unit for which hard stop is not masked, then at least one of the inputs to OR circuit 41 will be up, causing the output of inverter 42 to disable AND circut 39 in all of the error indicators. This will ensure that the highest priority totally unmasked error indicator is the one which is next presented to the priority network 15 of FIG. 2.

As is shown in FIG. 3, the remaining output of the error indicators, precondition line 12 is simply the concurrence of an error signal on line 30 and a signal on line 33 indicating that the functional unit is not masked, the concurring signals enabling AND circuit 43.

Those skilled in the art will recognize that a variety of changes may be made in the above described preferred embodiment of this invention without departing from the spirit and scope of the invention.

For example, the invention was described as being used within a system which includes a service processor which will, to at least some extent, control diagnosis and logging of the error conditions. Clearly, this invention could just as well be used in a system which simply stops upon error and then relies upon human intervention for its repair.

Similarly, the preferred embodiment of the invention utilizes latch/triggers to inhibit error signals from entering the priority network once they have been logged and accounted for. Of course, any appropriate technique for keeping track of, or degating, the utilized signals can be used.

Those skilled in the art will further recognize that this invention could, in effect, be compounded in order to trap a complete sequence of errors rather than, as in the preferred embodiment, preserving the first error to occur and then handling the others in accordance with a predetermined priority. However, this approach is not recommended because it is very doubtful that there would be enough advantage flowing from it to justify the increased expense and complexity. Typically, repair action will be based primarily upon the first error and an attempt will be made to correlate that error with any other error or errors which were logged in order to see if they are reasonably expectable secondary error to the primary error. Generally, repairing the cause of the first error will eliminate the others. When it does not, subsequent running of the system will automatically determine which of the other errors actually came first and the process can be repeated.

In still another modification, several of the mechanisms for degating error signals from the priority network and other parts of the system (the latch/triggers in the preferred embodiment) can be ganged together so that more than one input would be inhibited. This could be especially useful in systems where more than one error indicator relates to one functional unit. It then might be a good idea, after one error from a unit has been handled, to inhibit all remaining error indicators for that unit.

Yet another aspect of the preferred embodiment of the invention which is not necessarily essential to another embodiment is the extra safety provided by AND-ing the outputs of decoder 21 and priority circuit 15 when setting the latch/trigger. Assuming no malfunction in the circuitry, either of those outputs would be sufficient.

The most essential elements of this invention are: that the first error to occur in time (or the first of a specific type of error to occur) be positively identified; that additional errors which might arise before clocks are stopped also be identifiable; and that all of this information be retrievable from the system. The precise manner of implementation can and will vary from system to system depending upon specific system architectures and implementations.

While the invention has been shown and described with respect to preferred embodiments thereof, it will be understood by those skilled in the art that the above and other changes in form and details may be made therein without departing from the spirit and scope of the invention.

Having thus described our invention, what we claim as new, and desire to secure by Letters Patent is:

1. For use in a data processor system which includes a plurality of error indicators, each error indicator associated with a functional unit of the data processing system so as to provide indications of errors which may occur in the various functional units at different times before attention can be directed to them, apparatus for presenting such indications of the errors in sequence comprising:

storage means coupled to said error indicators for the receipt and preservation of a plurality of the error indications each indication from a different one of said error indicators; and selection means coupled to said storage means for selecting among the plurality of preserved error indications the indication of the first error to occur and identifying the error indicator which produced that indication and for identifying the preserved indications of subsequent errors and the error indicators that produced subsequent indications.

2. The apparatus of claim 1 further including priority means for reading said subsequent errors in accordance with a predetermined priority.

3. The apparatus of claim 1 further including:

priority means for presenting two simultaneously occurring error indications in accordance with a predetermined priority.

4. The apparatus of claim 2 in which said priority means includes:

inhibit means coupled to said error indicators for assuring higher priority to those errors which will cause one or more functional units to stop than to those errors which do not cause functional units to stop to thereby establish said predetermined priority.

* * * * *